United States Patent
Smith et al.

(10) Patent No.: US 12,417,886 B2
(45) Date of Patent: Sep. 16, 2025

(54) DEPOSITIONS OR LAYERS FOR MICROPOROUS MEMBRANES, IMPROVED MEMBRANES, IMPROVED LITHIUM BATTERY SEPARATORS, IMPROVED BATTERIES, IMPROVED HIGH VOLTAGE LITHIUM BATTERIES, AND RELATED METHODS

(71) Applicant: CELGARD, LLC, Charlotte, NC (US)

(72) Inventors: Ronnie E. Smith, Huntersville, NC (US); Katharine Chemelewski, Campbell, CA (US); Shante P. Williams, Charlotte, NC (US); Junqing Ma, Charlotte, NC (US); James M. Rapley, Charlotte, NC (US)

(73) Assignee: Celgard, LLC, Charlotte, NC (US)

( * ) Notice: Subject to any disclaimer, the term of this patent is extended or adjusted under 35 U.S.C. 154(b) by 344 days.

(21) Appl. No.: 16/088,475

(22) PCT Filed: Mar. 29, 2017

(86) PCT No.: PCT/US2017/024697
§ 371 (c)(1),
(2) Date: Sep. 26, 2018

(87) PCT Pub. No.: WO2017/172880
PCT Pub. Date: Oct. 5, 2017

(65) Prior Publication Data
US 2020/0303706 A1    Sep. 24, 2020

Related U.S. Application Data

(60) Provisional application No. 62/314,656, filed on Mar. 29, 2016.

(51) Int. Cl.
*H01M 10/00* (2006.01)
*H01G 11/52* (2013.01)
(Continued)

(52) U.S. Cl.
CPC ............ *H01G 11/52* (2013.01); *H01G 11/84* (2013.01); *H01M 50/403* (2021.01);
(Continued)

(58) Field of Classification Search
CPC ............ H01M 50/449; H01M 50/403; H01M 50/411; H01M 10/0525; H01M 6/14;
(Continued)

(56) References Cited

U.S. PATENT DOCUMENTS 3,666,517 A * 5/1972 Isaacson ................. C23C 14/58
427/328
7,790,320 B2 * 9/2010 Arora ................... H01M 50/463
429/251
(Continued)

FOREIGN PATENT DOCUMENTS

| | | | |
|---|---|---|---|
| JP | 2005196999 A | * 7/2005 | |
| KR | 1020050021131 | 3/2005 | |
| KR | 20160149632 A | * 12/2016 | .......... H01M 50/491 |

OTHER PUBLICATIONS

Machine translation of JP-2005196999-A, obtained Oct. 19, 2021 (Year: 2005).*
(Continued)

*Primary Examiner* — Nicholas P D'Aniello
(74) *Attorney, Agent, or Firm* — J. Clinton Wimbish; Maynard Nexsen PC

(57) ABSTRACT

A microporous membrane or substrate for an electrochemical device having a layer of a metal and/or metal oxide on at least one side of a polymeric porous membrane, wherein said layer is applied using a deposition method or technique such as vapor deposition, and wherein said layer contains one or more phases of a reactive metal oxide.

14 Claims, 14 Drawing Sheets

Structure end view or cross-section

(51) Int. Cl.
*H01G 11/84* (2013.01)
*H01M 50/403* (2021.01)
*H01M 50/414* (2021.01)
*H01M 50/417* (2021.01)
*H01M 50/426* (2021.01)
*H01M 50/431* (2021.01)
*H01M 50/434* (2021.01)
*H01M 50/451* (2021.01)
*H01M 50/454* (2021.01)
*H01M 50/457* (2021.01)
*H01M 50/489* (2021.01)
*H01M 10/0525* (2010.01)

(52) U.S. Cl.
CPC ....... *H01M 50/414* (2021.01); *H01M 50/417* (2021.01); *H01M 50/426* (2021.01); *H01M 50/431* (2021.01); *H01M 50/434* (2021.01); *H01M 50/451* (2021.01); *H01M 50/454* (2021.01); *H01M 50/457* (2021.01); *H01M 50/489* (2021.01); *H01M 10/0525* (2013.01)

(58) Field of Classification Search
CPC .. H01M 10/052; H01M 50/431; H01G 11/52; H01G 11/84; Y02E 60/10; C08J 9/365
See application file for complete search history.

(56) References Cited

U.S. PATENT DOCUMENTS

| | | | |
|---|---|---|---|
| 8,216,712 B1* | 7/2012 | Ramasubramanian | ...................... H01M 4/134 429/251 |
| 9,508,976 B2* | 11/2016 | Herle | .................. H01M 50/491 |
| 11,094,995 B2* | 8/2021 | Shi | ...................... H01M 50/489 |
| 2006/0024569 A1 | 2/2006 | Hennige et al. | |
| 2006/0251874 A1* | 11/2006 | McClure | ............ B01D 67/0088 428/210 |
| 2008/0180883 A1 | 7/2008 | Palusinski et al. | |
| 2009/0110807 A1* | 4/2009 | Koenig | .................. H10K 71/60 427/69 |
| 2011/0099969 A1* | 5/2011 | Ku | ......................... B01D 53/22 60/39.12 |
| 2011/0200863 A1 | 8/2011 | Xiao et al. | |
| 2014/0045033 A1* | 2/2014 | Zhang | ................. H01M 50/434 429/145 |
| 2015/0030933 A1* | 1/2015 | Goetzen | ............... C09D 153/00 429/231.95 |
| 2015/0325828 A1 | 11/2015 | Herle et al. | |
| 2017/0025658 A1* | 1/2017 | Shi | ......................... C23C 14/20 |
| 2020/0335759 A1* | 10/2020 | Lane | .................... H01M 2/166 |
| 2022/0094019 A1* | 3/2022 | Jeon | .................... H01M 50/457 |

OTHER PUBLICATIONS

Lee et al. "Effect of Al2O3 Coatings Prepared by RF Sputtering on Polyethylene Separators for High-Power Lithium Ion Batteries" Macromolecular Research, vol. 22, No. 11, pp. 1190-1195 (2014) (Year: 2014).*

Machine translation of KR 20160149632 A, obtained Jul. 2023 (Year: 2016).*

Search Report received Jul. 11, 2017; from counterpart PCT Application No. PCT/US2017/024697.

* cited by examiner

Ceramic coating (CS) over PVD conductive layer (Al) on PP base membrane (2500)

|  | 2500/Al | 2500/Al/CS |
|---|---|---|
| Thickness, μm | 25 | 29 |
| JIS Gurley, s | 202 | 244 |
| Shrinkage, % 105C1hr |  | 0.72 |
| 120C1hr |  | 2.64 |
| Ceramic layer peel force, N | NA | 114 |
| Ceramic powder fall, mg/cm2 | NA | 0.013 |

Figure 13A

```
2500/Al
Probes 3 inches apart using no tabs**         26 Ω
Probes 2 inches apart using no tabs           37 Ω
Probes 1 inch apart using no tabs             35 Ω
Probes 3 inches apart using tabs              32 Ω
Probes 2 inches apart using tabs              17 Ω
Probes 1 inch apart using tabs                25 Ω

2500/Al/CS
Probes 3" apart using no tabs                 ∞ Ω        ── Ceramic coating insulating well
Probes 2" apart using no tabs                 ∞ Ω
Probes 1" apart using no tabs                 ∞ Ω
Probes 3 inches apart using tabs              ∞ Ω
Probes 2 inches apart using tabs              ∞ Ω
Probes 1 inch apart using tabs                ∞ Ω

2500/Al (After CS coating removal)
Probes 3 inches apart using no tabs           144* Ω     ── Underneath coating, conductivity
Probes 2 inches apart using no tabs           272* Ω        remains
Probes 1 inch apart using no tabs             62 Ω
Probes 3 inches apart using tabs              56 Ω
Probes 2 inches apart using tabs              31 Ω
Probes 1 inch apart using tabs                29 Ω

Notes *high ohm due to coating residue. **tab: metal strip
```

Figure 13B

DEPOSITIONS OR LAYERS FOR MICROPOROUS MEMBRANES, IMPROVED MEMBRANES, IMPROVED LITHIUM BATTERY SEPARATORS, IMPROVED BATTERIES, IMPROVED HIGH VOLTAGE LITHIUM BATTERIES, AND RELATED METHODS

CROSS REFERENCE TO RELATED APPLICATIONS

The present application claims priority to and the benefit of U.S. provisional patent application Ser. No. 62/314,656 filed on Mar. 29, 2016, and which is hereby fully incorporated by reference herein.

FIELD OF THE INVENTION

In at least selected embodiments, the present application or invention is directed to novel or improved or optimized depositions, layers, membranes, porous membranes, microporous membranes, composite membranes, battery separators, composite separators, separators with one or more conductive layers, batteries, and/or related methods of manufacture and/or use thereof. In at least certain embodiments, the present application or invention is directed to novel or improved porous membranes and methods of making such membranes. The improved membranes may contain at least one multi-phase metal or metal oxide deposition layer which is stable up to 5 volts or to 7 volts in a battery. In at least certain particular embodiments, the multi-phase deposition layer provides improved charge/discharge capacity. In at least certain selected embodiments, the multi-phase deposition layer provides improved wettability and/or favorable moisture retention properties. In at least certain other embodiments, the multi-phase deposition layer provides improved mechanical strength. By depositing a multi-phase metal or metal oxide matrix on the membrane, the modified membrane may have improved impedance/charge transfer, dielectric breakdown, and/or improved safety. By employing an ultra-thin deposition layer, the energy density of a battery may be increased. The multi-phase deposition is preferably an ultra-thin layer of metal or metal oxide applied to a porous membrane via a deposition technique that utilizes an external energy source, such as laser, pulsed laser, or ultra-short pulsed laser deposition. In accordance with at least particular embodiments, the improved battery separators or battery separator membranes described herein may have a conductive deposition layer on at least the cathode facing side and in some embodiments may be embedded between and or within polyolefin membranes or may be covered by one or more coatings or treatments. In accordance with at least selected embodiments, the present application or invention is directed to novel or improved porous membranes or substrates, separator membranes, separators, composites, electrochemical devices, batteries, cells, methods of making such membranes or substrates, separators, cells, and/or batteries, and/or methods of using such membranes or substrates, separators, cells, and/or batteries.

BACKGROUND OF THE INVENTION

The use of ceramic-containing and polymeric coatings are known methods to improve the performance of microporous membranes commonly used in lithium ion batteries. Coatings may be applied onto one or both sides of the separator. Traditional coating techniques have included dip coating, knife, gravure, curtain, and spray, and these coatings have been found to be thick and non-uniform. Recently, more advanced deposition techniques have been utilized to attempt to provide uniformity and reduce coating thickness from 2 to 6 microns to a few nanometers in thickness. Both metal and metal-oxides are thought to provide benefits to the separator with the crystalline phase being important in determining the in-situ battery performance. For example, aluminum oxide has been incorporated into many ceramic coatings due to its mechanical strength, chemical stability, and electrochemical properties. Aluminum oxide (Alumina) can be found in a number of crystalline phases or polymorphs ($\alpha$, $\gamma$, $\eta$, $\delta$, x, $\chi$, etc.). The alpha phase has been found to be thermodynamically stable and chemically inert making it suitable for high temperature applications. The formation of aluminum oxide on to porous membranes can be achieved using various techniques of chemical and physical vapor depositions. The amorphous phase transformations that the aluminum oxide move through at temperatures above 500° C. can only be achieved using physical vapor deposition. Several polymorphs of alumina can exist as temperature increases (($\gamma \to \delta/\theta \to \alpha$). Due to its favorable characteristics, pure a phase aluminum oxide has been desirable in ceramic coatings for porous films. However, to achieve the electrochemical and oxidation protective properties on microporous film, more specifically in battery separators, the layer of pure a phase aluminum oxide needs to be several microns thick, often yielding inconsistent performance results.

With the continued advancement of battery capabilities and capacity there is a need for improved separators, for example, greater strength in conjunction with a thinner separator, functionalized separators, and the like. And, there may also be a need to improve the final composition of coating delivered striking a balance between thickness and battery performance.

SUMMARY OF THE INVENTION

In at least selected embodiments, aspects, or objects, the present application or invention may address the above needs or issues and/or may provide novel or improved depositions, layers, membranes, porous membranes, microporous membranes, composite membranes, battery separators, composite separators, separators with one or more conductive layers, batteries, and/or related methods of manufacture and/or use thereof. In at least certain embodiments, the present application or invention is directed to novel or improved porous membranes and methods of making such membranes. The improved membranes may contain at least one multi-phase metal or metal oxide deposition layer which is stable up to 5 volts or to 7 volts in a battery. In at least certain particular embodiments, the multi-phase deposition layer provides improved charge/discharge capacity. In at least certain selected embodiments, the multi-phase deposition layer provides improved wettability and/or favorable moisture retention properties. In at least certain other embodiments, the multi-phase deposition layer provides improved mechanical strength. By depositing a multi-phase metal or metal oxide matrix on the membrane, the modified membrane may have improved impedance/charge transfer, dielectric breakdown, and/or improved safety. By employing an ultra-thin deposition layer, the energy density of a battery may be increased. The multi-phase deposition is preferably an ultra-thin layer of metal or metal oxide applied to a porous membrane via a deposition technique that utilizes an external energy source, such as laser, pulsed laser, or ultra-short pulsed laser deposition. In accordance with at least particular embodiments, the improved battery separators or battery separator membranes described herein may have a conductive deposition layer on at least the cathode facing side and in some embodiments may be embedded between and or within polyolefin membranes or may be covered by one or more coatings or treatments. In accordance with at least selected embodiments, the present application or invention is directed to novel or improved porous membranes or substrates, separator membranes, separators, composites, electrochemical devices, batteries, cells, methods of making such membranes or substrates, separators, cells, and/or batteries, and/or methods of using such membranes or substrates, separators, cells, and/or batteries.

In accordance with at least selected embodiments, aspects, or objects, the present application or invention may address the above needs or issues and/or may provide novel or improved or optimized depositions, layers, membranes, porous membranes, microporous membranes, battery separator membranes, battery separators, batteries, cells, and/or related methods of manufacture and/or use thereof. In at least certain embodiments, the present application or invention is directed to novel or improved porous membranes and methods of making such membranes. The improved membranes may contain at least one multi-phase metal or metal oxide deposition layer on at least one side thereof and which is stable up to 7 volts in a battery. In at least certain particular embodiments, the multi-phase deposition layer provides improved charge/discharge capacity. In at least certain selected embodiments, the multi-phase deposition layer provides improved wettability and/or favorable moisture retention properties. In at least certain other embodiments, the multi-phase deposition layer provides improved oxidation resistance and/or mechanical strength. By depositing a multi-phase metal or metal oxide matrix on the membrane, the modified membrane may have improved impedance/charge transfer, dielectric breakdown, and/or improved safety. By employing an ultra-thin deposition layer, the energy density of a battery may be increased. The multi-phase deposition is preferably an ultra-thin layer of metal or metal oxide applied to a porous membrane via a deposition technique that utilizes an external energy source such as laser, pulsed laser, or ultra-short pulsed laser deposition. In accordance with at least particular embodiments, the improved battery separators or battery separator membranes described herein may have a conductive or non-conductive deposition such as a conductive layer on at least the cathode facing side and in some embodiments may be embedded between and or within polyolefin membranes. In accordance with at least selected embodiments, the present application or invention is directed to novel or improved porous membranes or substrates, separator membranes, separators, composites, oxidation resistance deposition layers, oxidation resistant membranes, electrochemical devices, batteries, cells, methods of making such membranes or substrates, separators, cells, and/or batteries, and/or methods of using such membranes or substrates, separators, cells, and/or batteries.

In accordance with at least selected embodiments, aspects, or objects, the present application or invention may address the above needs or issues and/or may provide an ultra-thin multi-phase metal or metal oxide deposition layer onto a porous membrane, an improved charge/discharge capacity, excellent transfer charge, and stability up to 7 volts in an electrochemical cell.

In accordance with certain embodiments, the separator membrane described herein is directed to a microporous separator membrane having an ultra-thin multi-phase metal oxide deposition layer where the deposition layer has a thickness of 5 µm or less, preferably 1 µm or less, and more preferably 500 nm or less.

In at least certain embodiments, the separator membrane described herein may contain a deposition layer including multiple phases of metal oxide including but not limited to α-phase aluminum oxide and boehmite (or böhmite or aluminum oxide hydroxide (γ-AlO(OH)) mineral a component of aluminum ore or bauxite).

In accordance with at least selected embodiments, aspects, or objects, the present application or invention may address the above needs or issues and/or may provide an ultra-thin multi-phase metal or metal oxide deposition layer onto a porous membrane, with one or more depositions, treatments, layers, materials, or coatings over or on top of at least a portion of the ultra-thin multi-phase metal or metal oxide deposition layer.

In accordance with certain embodiments, the separator membrane described herein is directed to a microporous separator membrane having a conductive, semi-conductive or non-conductive deposition layer on at least one surface thereof with one or more conductive, semi-conductive or non-conductive depositions, treatments, layers, materials, or coatings over or on top of at least a portion of the deposition layer.

In at least certain embodiments, the separator membrane described herein may contain a deposition layer including multiple phases of metal oxide including but not limited to α-phase aluminum oxide and boehmite (or bohmite or aluminum oxide hydroxide (γ-AlO(OH)) mineral a component of aluminum ore or bauxite) on at least one surface thereof with one or more conductive, semi-conductive or non-conductive depositions, treatments, layers, materials, or coatings over or on top of at least a portion of the deposition layer.

The inventive oxidation resistance or oxidation resistant deposition layer on a microporous membrane or substrate for a lithium battery, such as a separator membrane or separator for a secondary lithium battery, lithium ion battery, or lithium polymer battery, may be at least on the side of the separator membrane which faces the cathode where the layer may be ultra-thin at the interface of the separator and the cathode, and may be stable at voltages up to 7 volts in a high voltage battery system, and/or may provide an ultra-thin highly oxidation resistant microporous separator that may prevent trickle charge at high voltages up to 7 volts in a lithium battery, and/or provide improved charge capacity and/or transfer rate.

In accordance with at least certain selected embodiments, the present invention is directed towards a separator for a battery which has an ultra-thin multi-phase deposition, layer or coating that provides oxidation protection, maintained or improved porosity, maintained or improved mechanical strength, maintained or improved shutdown behavior, and/or maintained or improved water content. The deposition, layer or coating is preferably applied to the separator using Physical Vapor Deposition (PVD), Chemical Vapor Deposition (CVD), Pulsed Laser Deposition (PLD), Atomic Layer Deposition (ALD), or ultra-short pulsed laser deposition (USPLD), Evaporative Coating at Atmospheric Pressure (ECAP), Sputtering, and/or E-beam, possibly more preferably applied by Physical Vapor Deposition (PVD), Pulsed Laser Deposition (PLD), ultra-short pulsed laser deposition (USPLD), or the like.

coated or modified Celgard® 2500 microporous membrane (uncoated side) at a magnification of 5,000×.

Figure 1:
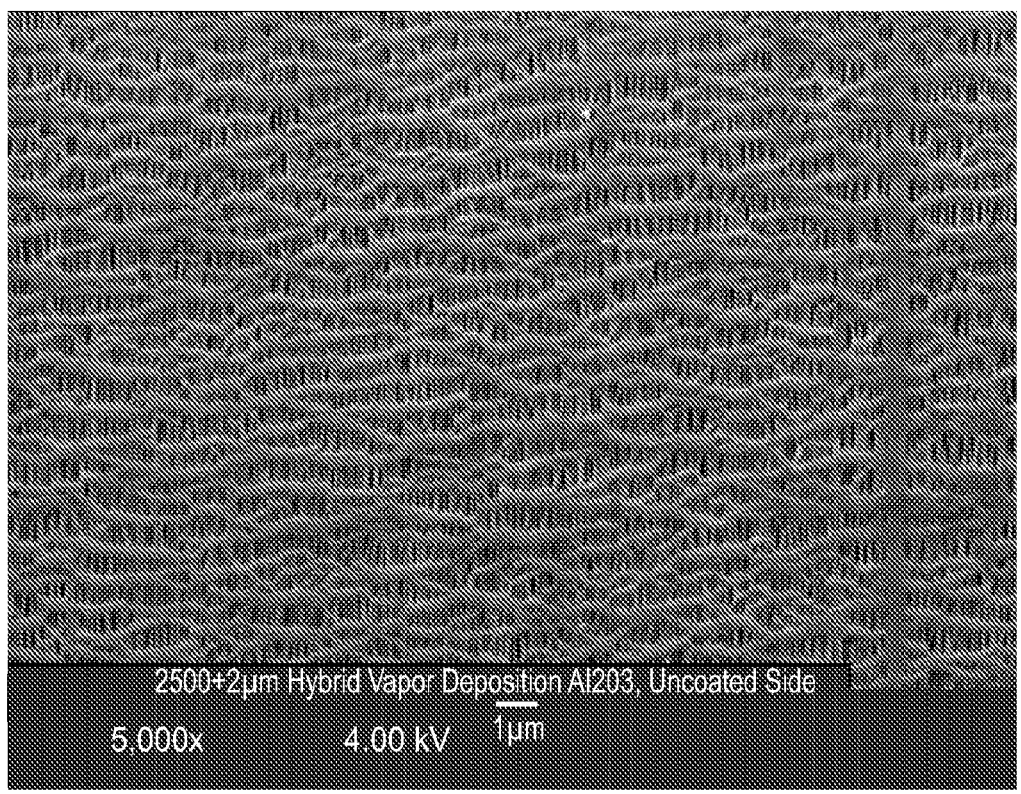
FIG. 1 includes a Scanning Electron Micrograph (SEM) image of the surface of an inventive Example 1 (EX 1)
Figure 2:
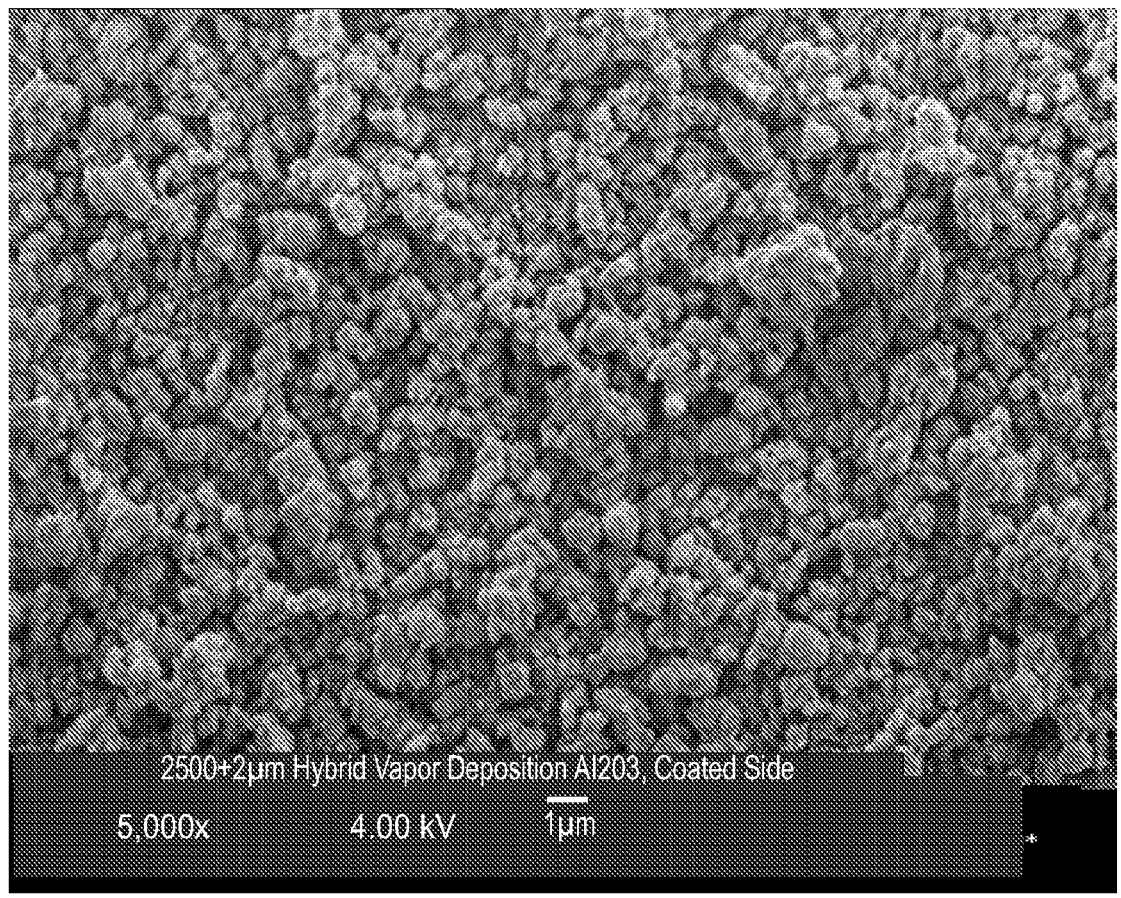

FIG. 2 includes a Scanning Electron Micrograph (SEM) image of the surface of the coated side of the Example 1 Celgard® 2500 microporous membrane of FIG. 1 coated with 2 um of Al2O3 at a magnification 5,000×.

Figure 3:
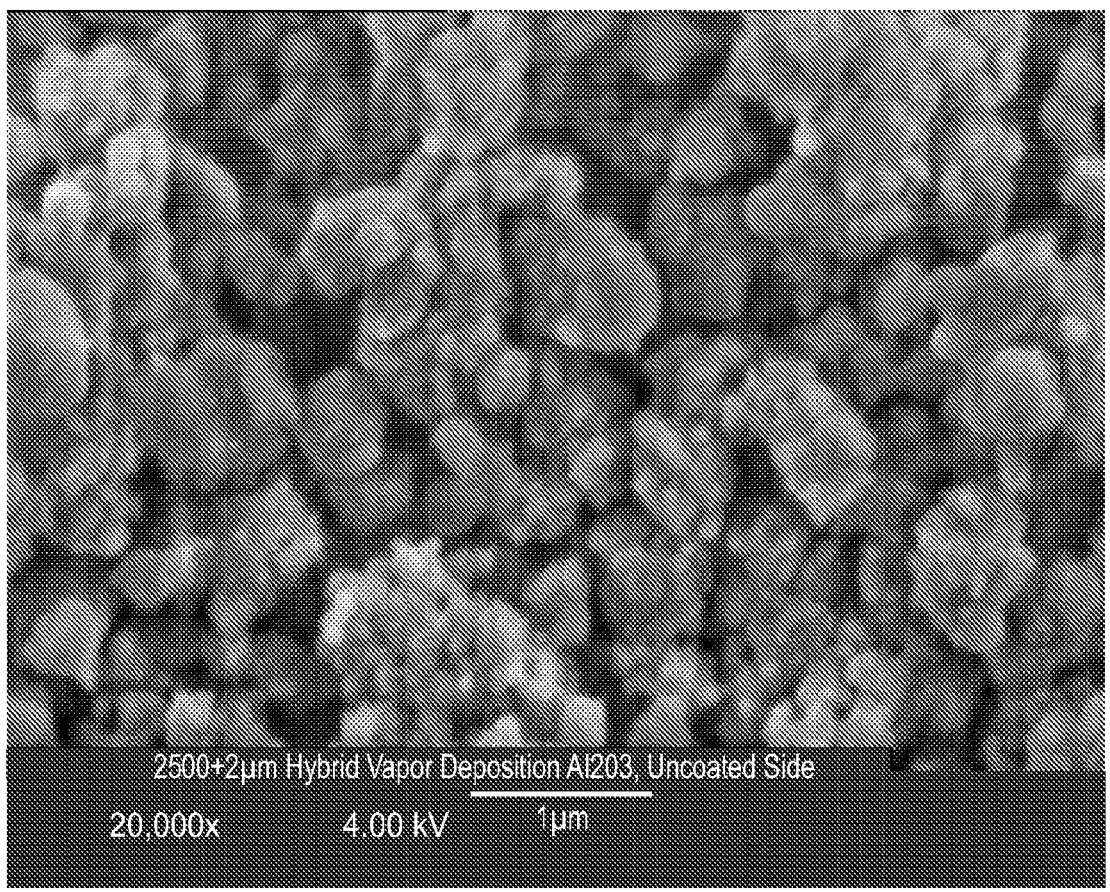

FIG. 3 includes a Scanning Electron Micrograph (SEM) image of the coated surface of the Example 1 Celgard® 2500 microporous membrane of FIG. 2 coated with 2 um Al2O3 at a magnification 20,000×.

Figure 4:
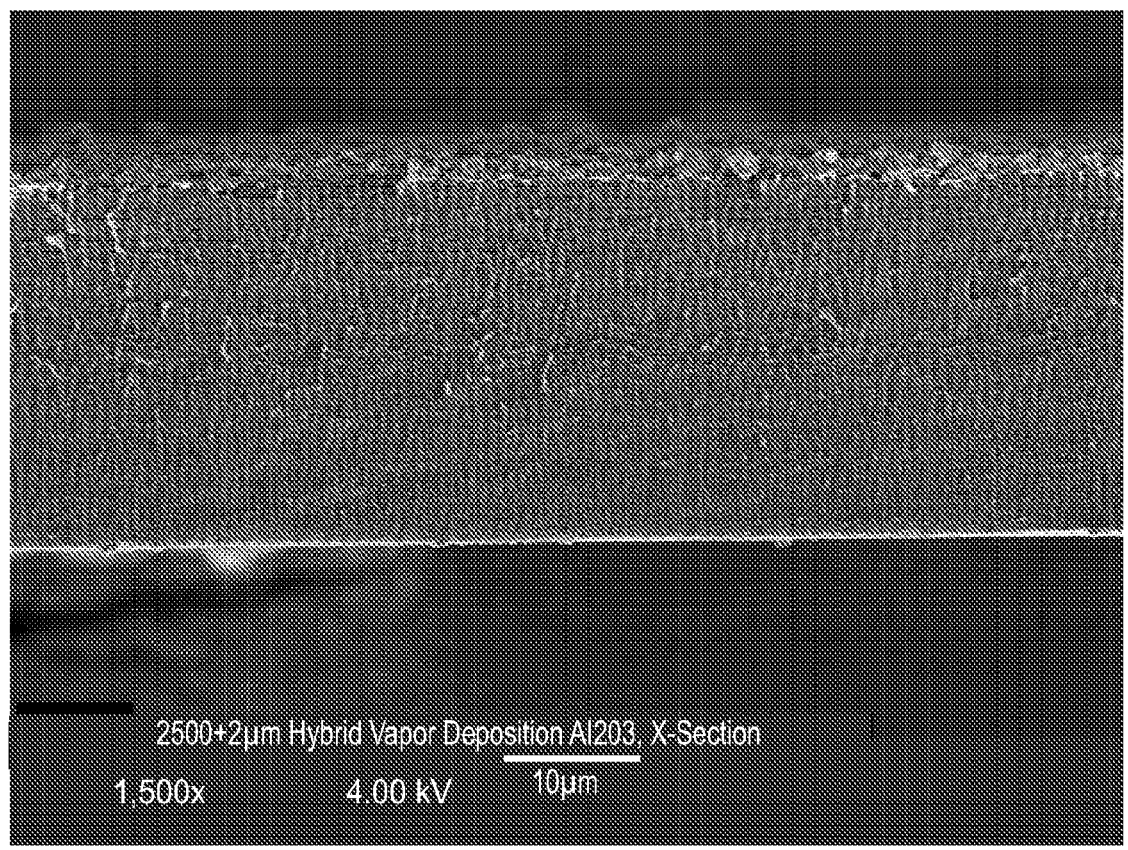

FIG. 4 includes a Scanning Electron Micrograph (SEM) image of the cross section of the Example 1 Celgard® 2500 microporous membrane coated with 2 um Al2O3 at a magnification 1, 500×.

Figure 5:
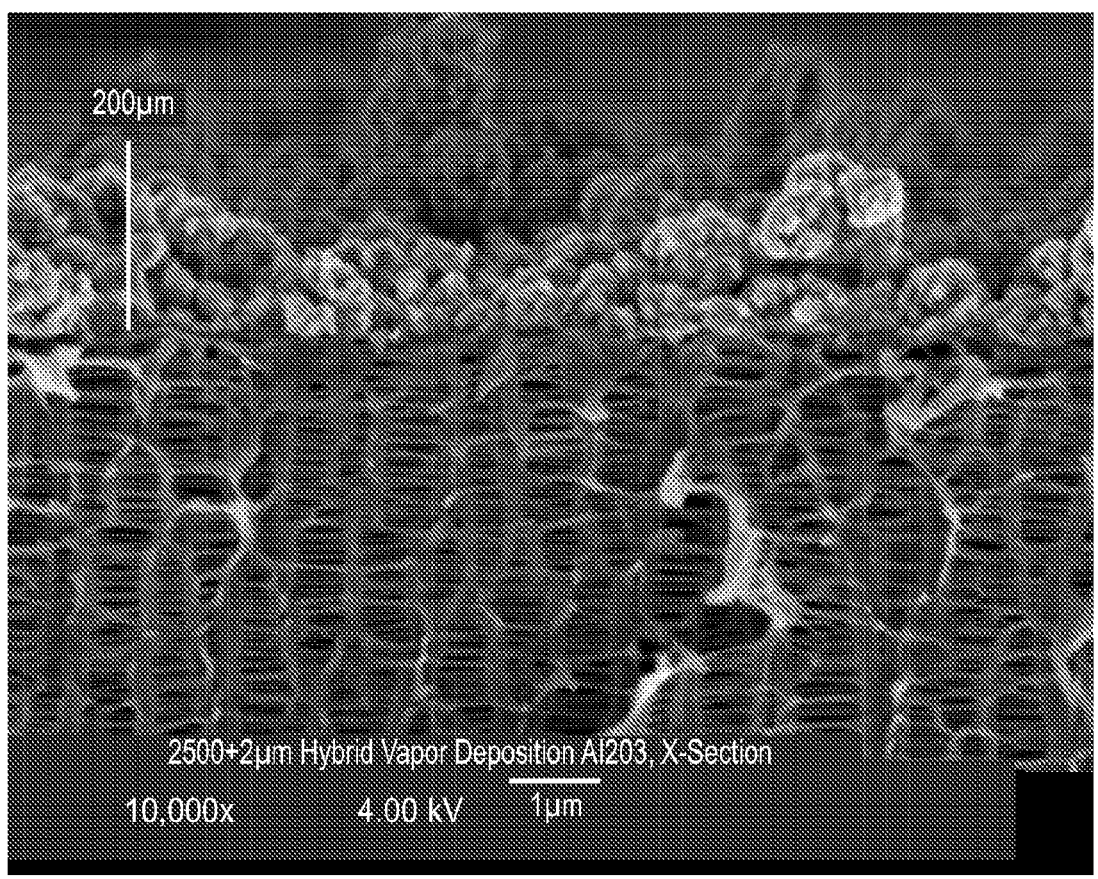

FIG. 5 includes a Scanning Electron Micrograph (SEM) image of the partial cross section of the Example 1 Celgard® 2500 microporous membrane of FIG. 4 coated with 2 um Al2O3 at a magnification 10,000×.

Figure 6:
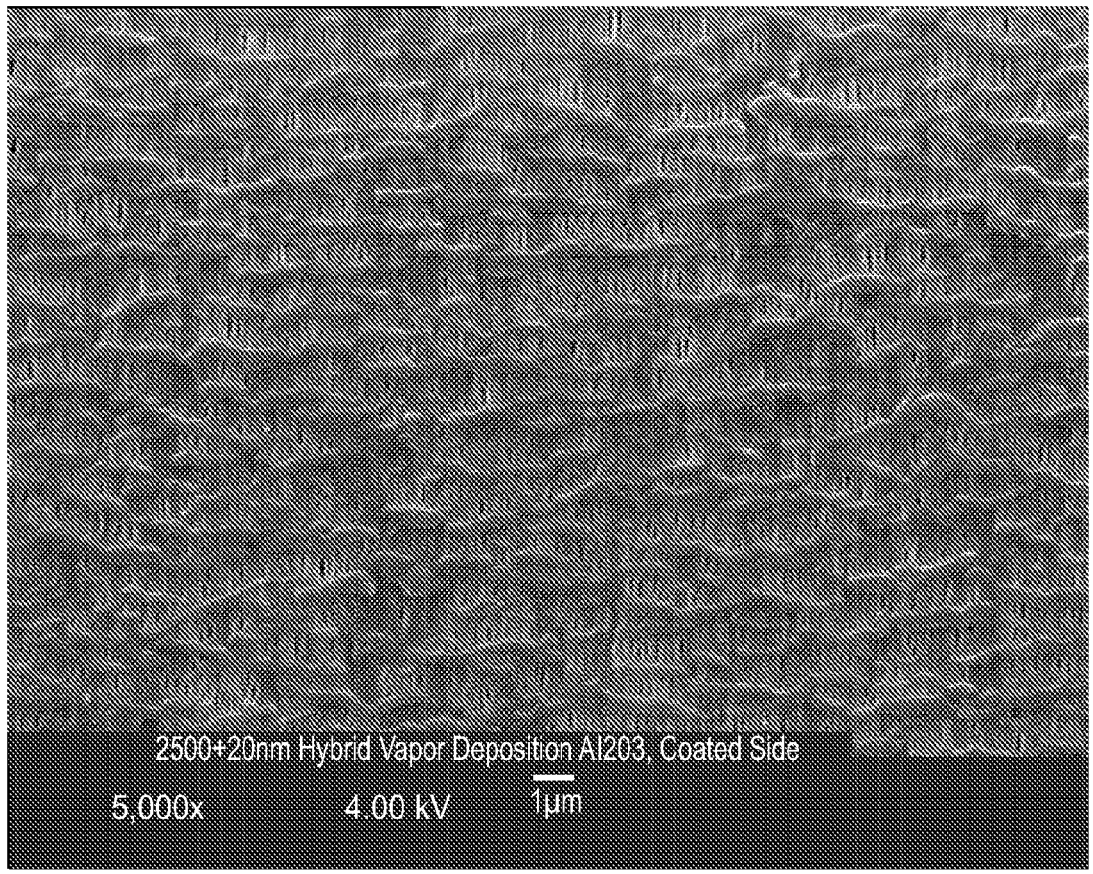

FIG. 6 includes a Scanning Electron Micrograph (SEM) image of the surface of the coated side of an Example 2 Celgard® 2500 microporous membrane coated with 20 nm Al2O3 at a magnification 5,000×.

Figure 7:
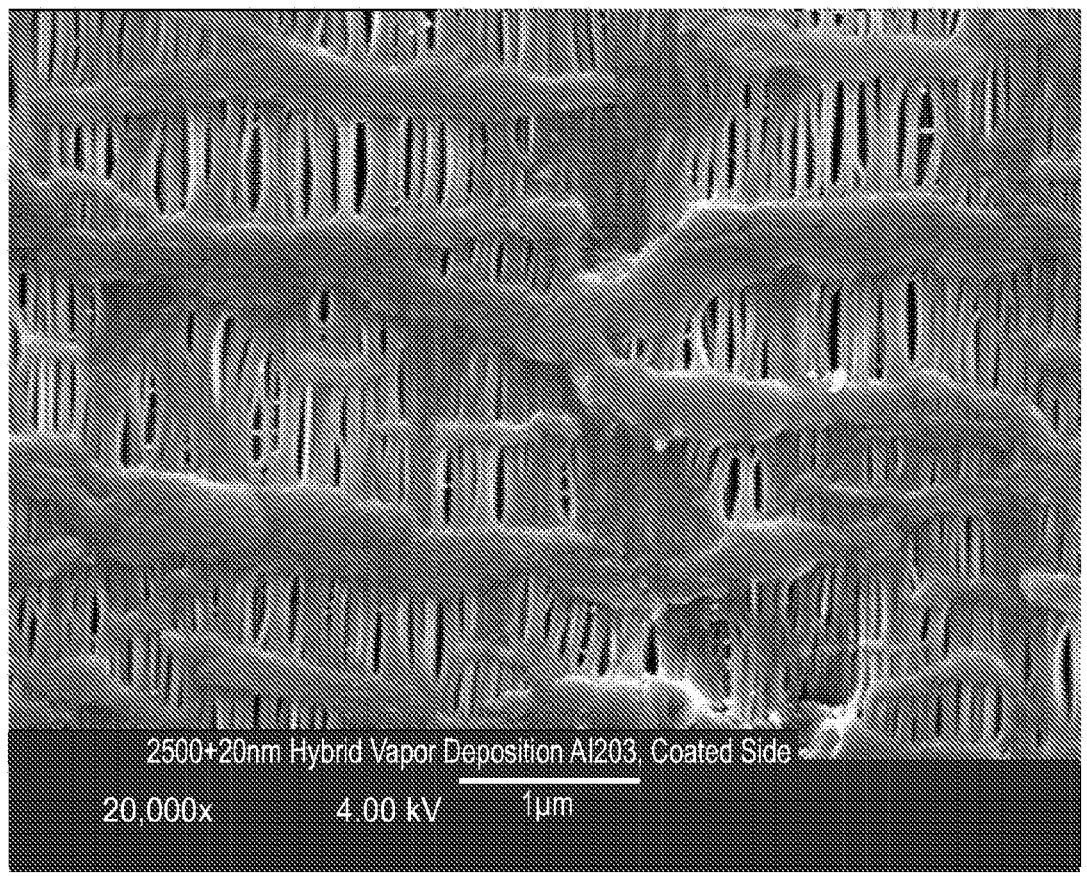

FIG. 7 includes a Scanning Electron Micrograph (SEM) image of the coated surface of the coated Example 2 Celgard® 2500 microporous membrane of FIG. 6 coated with 20 nm Al2O3 at a magnification 20,000×.

Figure 8:
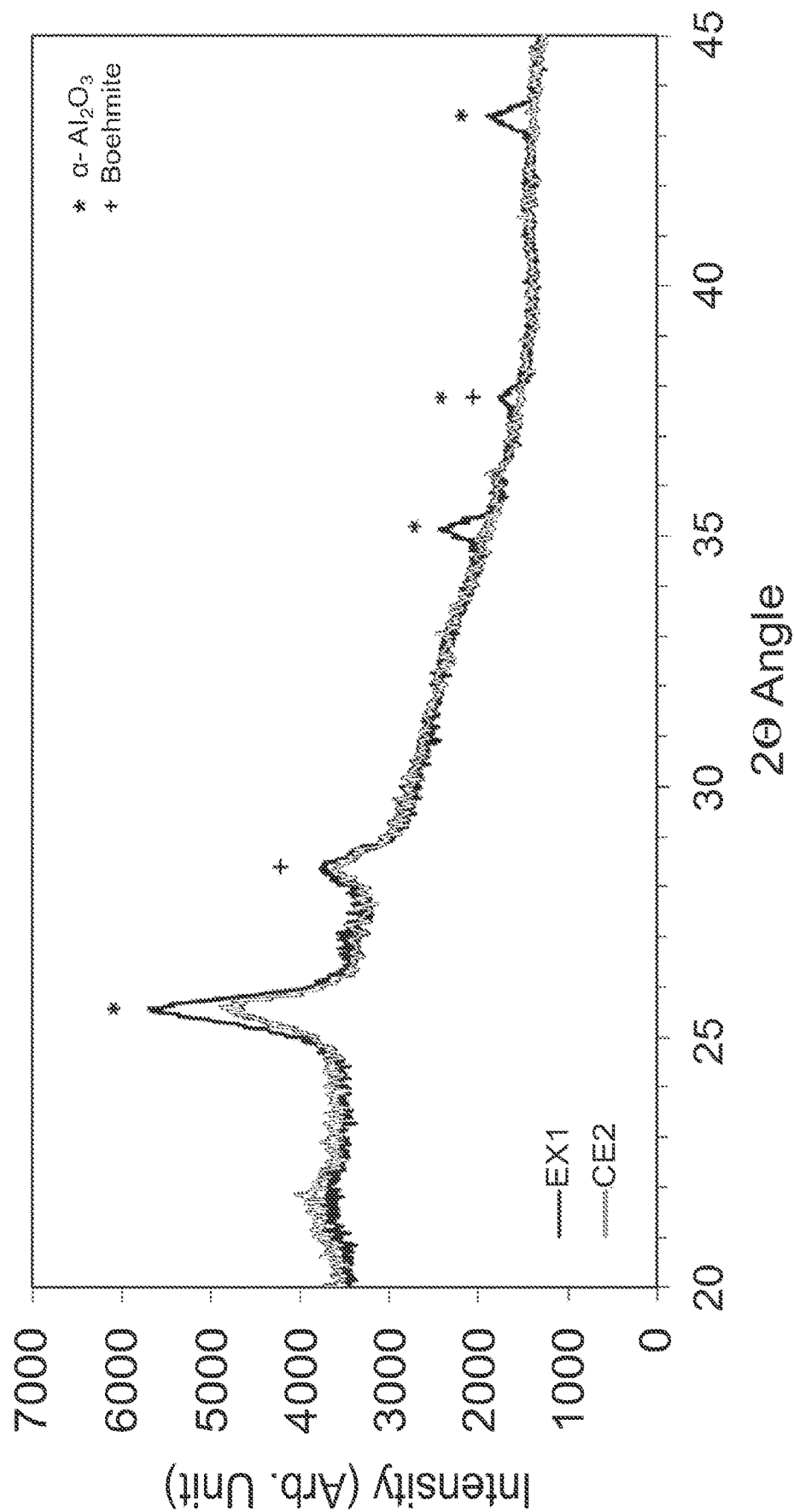

FIG. 8 includes a graphic of XRD analysis of Example 1 (EX 1) coated with 2 um of Al2O3 showing peaks of alpha phase Al2O3 and Boehmite (the black or top line) as compared to another PVD product as Comparative Example 2 (CE2).

Figure 9:
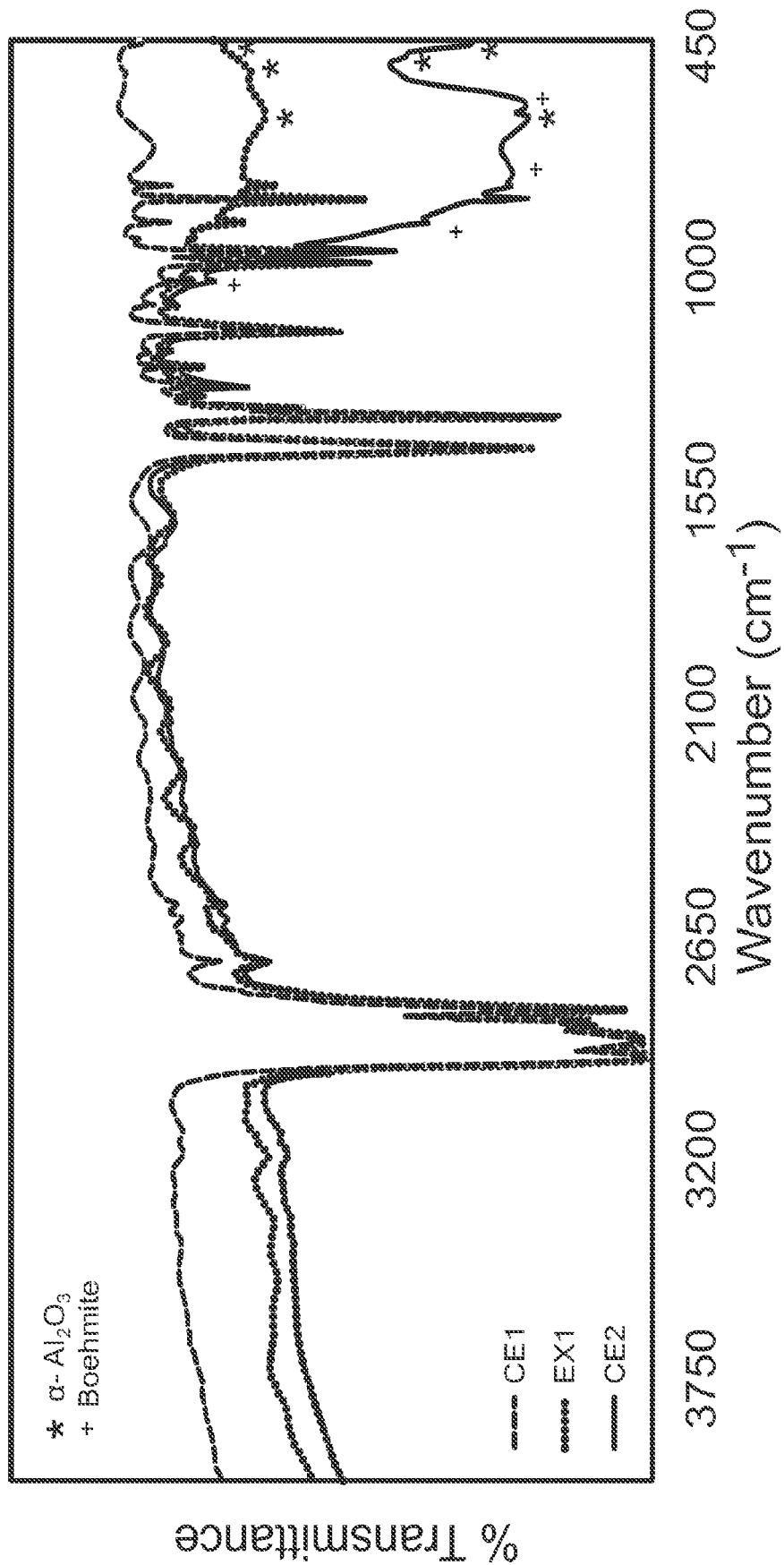

FIG. 9 includes a graphic of FTIR analysis of Example 1 (EX 1) coated with 2 μm of Al2O3 showing peaks of alpha phase Al2O3 and Boehmite (the black or bottom line) as compared to other PVD products (CE1, CE2).

Figure 10A:
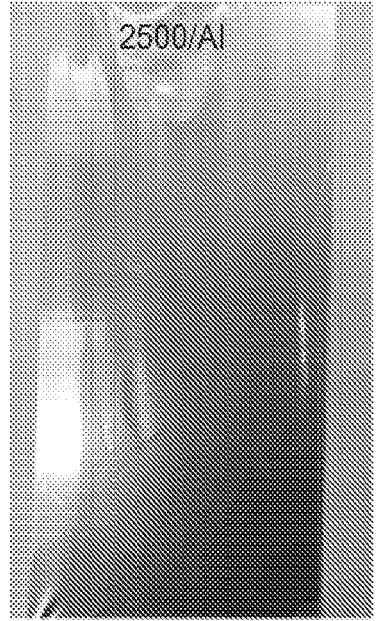
Figure 10B:
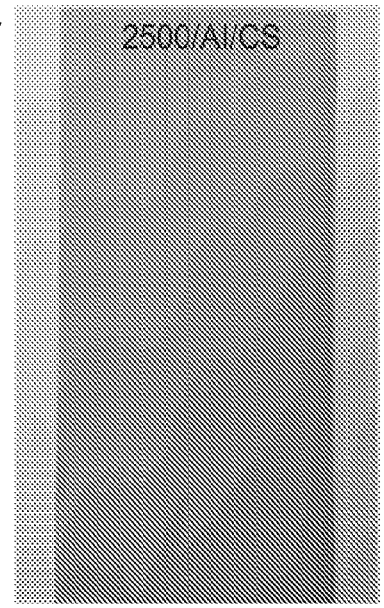

FIGS. 10A and 10B are respective before and after surface images of an exemplary PVD treated membrane and the PVD treated membrane with a ceramic coating over the PVD treatment.

Figure 11:
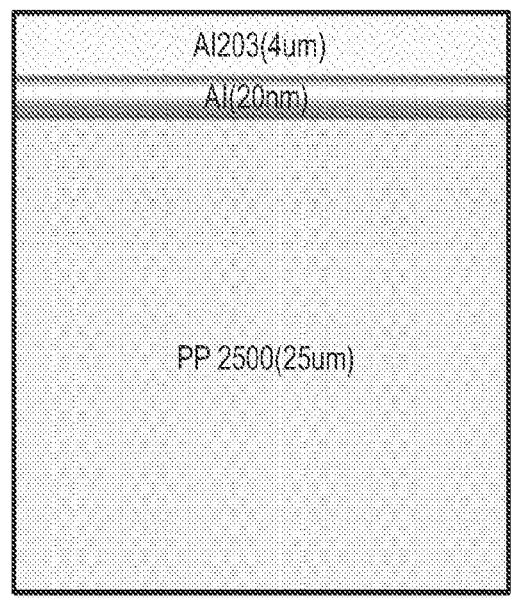

FIG. 11 is a schematic end view or cross-section view of the exemplary ceramic coated PVD treated membrane or film of FIG. 10B.

Figure 12A:
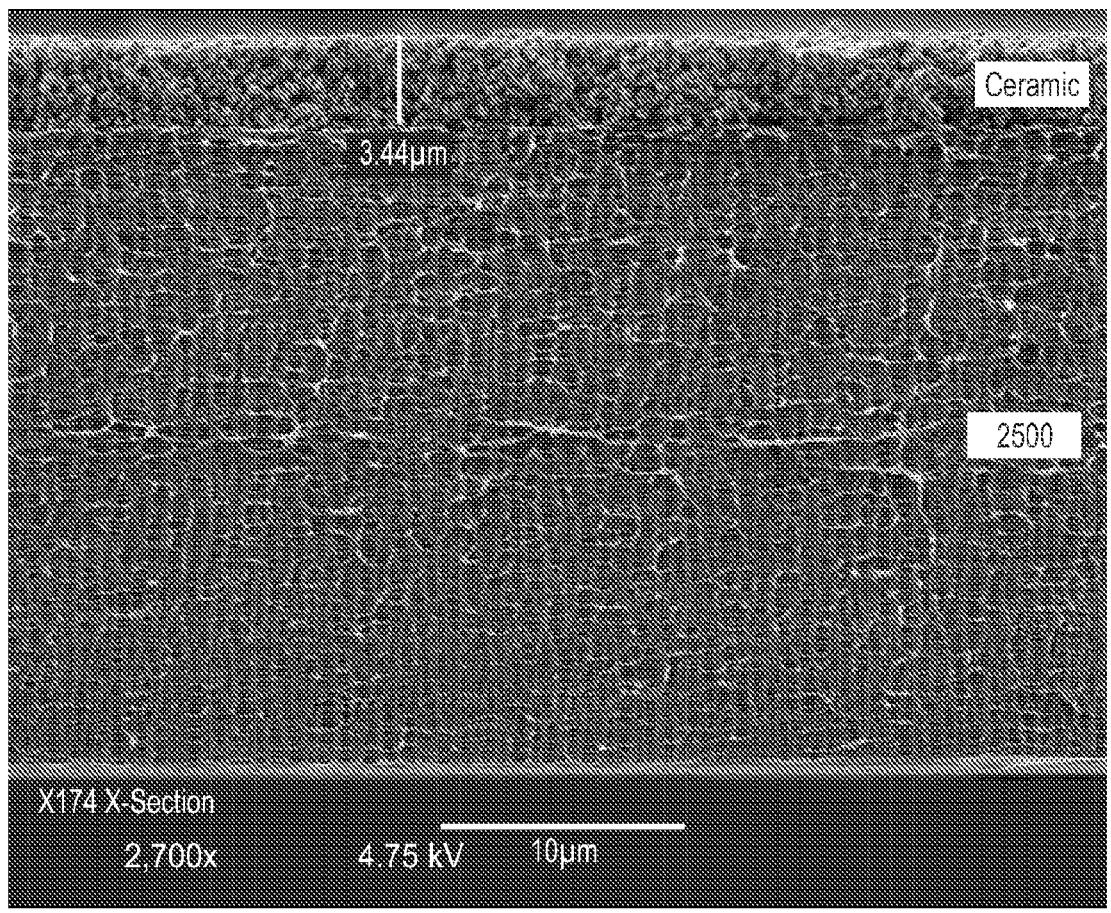
Figure 12B:
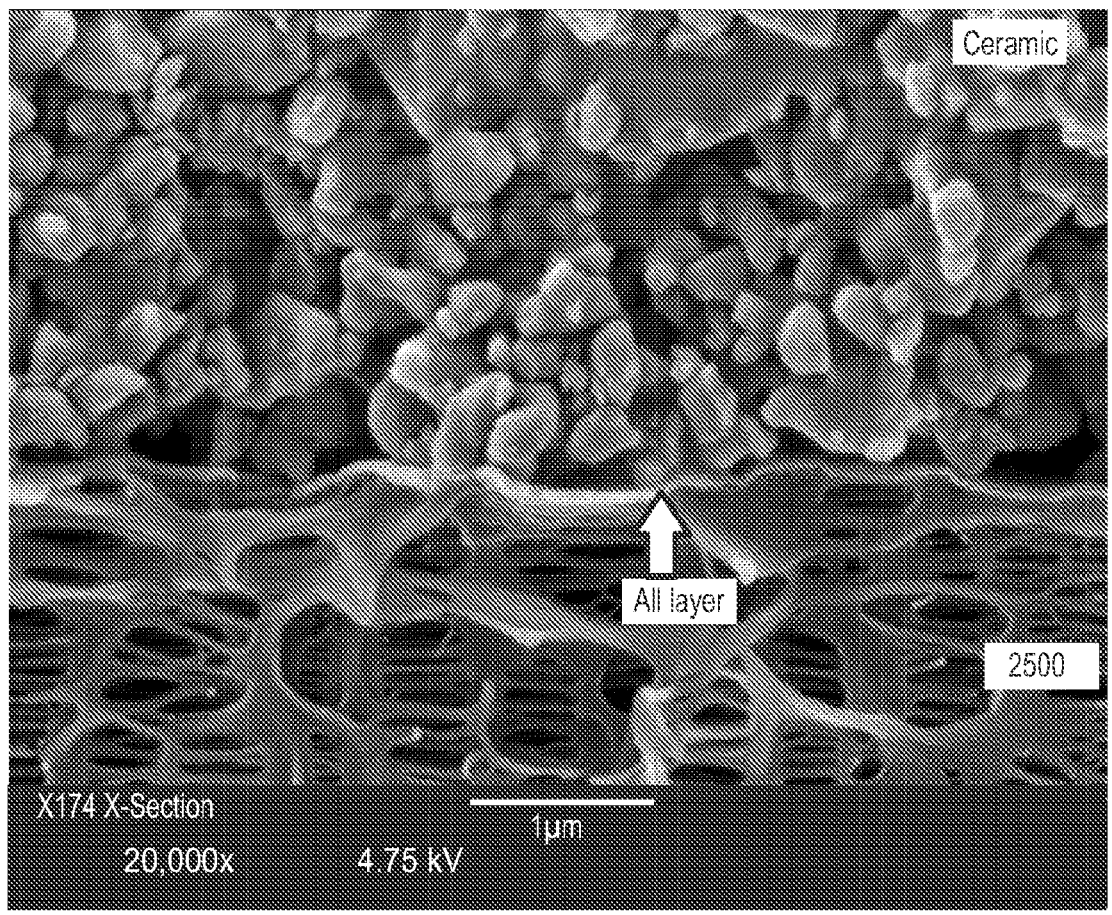

FIGS. 12A and 12B are respective cross-section SEM images at 2,700× magnification and 20,000× magnification of the exemplary ceramic coated PVD treated membrane or film of FIG. 10B.

FIGS. 13A and 13B summarize the properties of the acrylic based binder and alumina particle ceramic coating of FIG. 10B.

DETAILED DESCRIPTION OF THE INVENTION

In at least selected embodiments, aspects, or objects, the present application or invention may address the above needs or issues and/or may provide novel or improved depositions, layers, membranes, porous membranes, microporous membranes, composite membranes, battery separators, composite separators, separators with one or more conductive layers, batteries, and/or related methods of manufacture and/or use thereof. In at least certain embodiments, the present application or invention is directed to novel or improved porous membranes and methods of making such membranes. The improved membranes may contain at least one multi-phase metal or metal oxide deposition layer which is stable up to 5 volts or to 7 volts in a battery. In at least certain particular embodiments, the multi-phase deposition layer provides improved charge/discharge capacity. In at least certain selected embodiments, the multi-phase deposition layer provides improved wettability and/or favorable moisture retention properties. In at least certain other embodiments, the multi-phase deposition layer provides improved mechanical strength. By depositing a multi-phase metal or metal oxide matrix on the membrane, the modified membrane may have improved impedance/charge transfer, dielectric breakdown, and/or improved safety. By employing an ultra-thin deposition layer, the energy density of a battery may be increased. The multi-phase deposition is preferably an ultra-thin layer of metal or metal oxide applied to a porous membrane via a deposition technique that utilizes an external energy source, such as laser, pulsed laser, or ultra-short pulsed laser deposition. In accordance with at least particular embodiments, the improved battery separators or battery separator membranes described herein may have a conductive deposition layer on at least the cathode facing side and in some embodiments may be embedded between and or within polyolefin membranes or may be covered by one or more coatings or treatments. In accordance with at least selected embodiments, the present application or invention is directed to novel or improved porous membranes or substrates, separator membranes, separators, composites, electrochemical devices, batteries, cells, methods of making such membranes or substrates, separators, cells, and/or batteries, and/or methods of using such membranes or substrates, separators, cells, and/or batteries.

In at least selected embodiments, the present application or invention is directed to novel or improved porous membranes and methods of making such membranes. The improved membrane may preferably contain at least one multi-phase metal or metal oxide deposition layer which is preferably stable up to 7 volts in a battery. In at least certain embodiments, the multi-phase deposition layer provides improved charge/discharge capacity. In at least certain selected embodiments, the multi-phase deposition layer provides improved wettability and favorable moisture retention properties (less water). In at least certain embodiments, the multi-phase deposition layer provides improved mechanical strength. By depositing a multi-phase metal or metal oxide matrix (preferably with more alpha phase Al2O3 and boehmite, or with more amorphous content) the membrane may have improved impedance/charge transfer, improved dielectric breakdown, and improved safety. See FIGS. 1-9. By employing an ultra-thin deposition layer, the energy density of a battery may be increased. See FIGS. 1-5, 8 and 9. The multi-phase deposition is preferably an ultra-thin layer of metal or metal oxide applied to a porous membrane via a deposition technique that preferably utilizes an external energy source such as laser, pulsed laser, or ultra-short pulsed laser deposition and uses a laser target material such as Al2O3, boehmite, or both to produce a deposition having a multi-phase metal or metal oxide, with high alpha phase Al2O3 content, with a high amorphous or alpha phase Al2O3 content, with high alpha phase Al2O3 and boehmite content, with a higher content of alpha-$Al_2O_3$ and boehmite, with a high degree of crystallinity both for alpha-$Al_2O_3$ and boehmite, or the like. See FIGS. 1-5, 8 and 9.

Test Methods

FTIR—The sample was scanned in transmission mode over a wavenumber range of 4000-450 cm−1 for 16 repetitions. The coated side was facing the beam.

XRD—The sample was scanned over a range of 20-45 degrees 2 theta with a step size of 0.02 and a dwell time of 3 seconds. The sample was prepared with coated side facing the beam.

Furthermore, in accordance with at least particular embodiments, the deposition layer of the inventive battery separator membrane described herein is a conductive deposition layer and may be on at least the cathode facing side and in some embodiments may be embedded between and/or within polyolefin membranes. In accordance with at least selected embodiments, the deposition layer of the inventive battery separator membrane described herein is a non-conductive deposition layer and may be on at least the cathode facing side and in some embodiments may be embedded between and/or within polyolefin membranes, and/or coated with a polymer coating or ceramic coating. In accordance with at least certain embodiments, the deposition layer of the inventive battery separator membrane described herein is a conductive or non-conductive deposition layer and may be on at least one side or both sides of the membrane, and the present application or invention is directed to such novel or improved porous membranes or substrates, separator membranes, separators, composites, electrochemical devices, batteries, methods of making such membranes or substrates, separators, and/or batteries, and/or methods of using such membranes or substrates, separators and/or batteries.

Still further, in accordance with at least certain particular embodiments, the deposition layer of the inventive battery separator membrane described herein is a conductive deposition layer and may be on at least the anode facing side and in some embodiments may be embedded between and/or within polyolefin membranes and/or covered with one or more non-conductive layers or coatings, such as being coated with a polymer coating or ceramic coating (with or without a polymer binder). Such a conductive layer can be part of a battery or cell safety system which senses dendrites, shorts, heat, and/or other potential failure modes. In accordance with at least selected embodiments, the deposition layer of the inventive battery separator membrane described herein is a non-conductive deposition layer and may be on at least the anode facing side and in some embodiments may be embedded between and/or within polyolefin membranes, and/or coated with a polymer coating or ceramic coating.

In at least selected embodiments, the present application or invention is directed to novel or improved or optimized depositions, layers, membranes, porous membranes, microporous membranes, battery separators, batteries, and/or related methods of manufacture and/or use thereof. In at least certain embodiments, the present application or invention is directed to novel or improved porous membranes and methods of making such membranes. The improved membranes may contain at least one multi-phase metal or metal oxide deposition layer which is stable up to 7 volts in a battery. In at least certain particular embodiments, the multi-phase deposition layer provides improved charge/discharge capacity. In at least certain selected embodiments, the multi-phase deposition layer provides improved wettability and/or favorable moisture retention properties. In at least certain other embodiments, the multi-phase deposition layer provides improved mechanical strength. By depositing a multi-phase metal or metal oxide matrix on the membrane, the modified membrane may have improved impedance/charge transfer, dielectric breakdown, and/or improved safety. By employing an ultra-thin deposition layer, the energy density of a battery may be increased. The multi-phase deposition is preferably an ultra-thin layer of metal or metal oxide applied to a porous membrane via a deposition technique that utilizes an external energy source such as laser, pulsed laser, or ultra-short pulsed laser deposition. In accordance with at least particular embodiments, the improved battery separators or battery separator membranes described herein may have a conductive or non-conductive deposition such as a conductive deposition layer on at least the cathode facing side and in some embodiments may be embedded between and or within polyolefin membranes. In accordance with at least selected embodiments, the present application or invention is directed to novel or improved porous membranes or substrates, separator membranes, separators, composites, electrochemical devices, batteries, cells, methods of making such membranes or substrates, separators, cells, and/or batteries, and/or methods of using such membranes or substrates, separators, cells, and/or batteries.

The improved membrane contains a multi-phase metal or metal oxide deposition layer which is stable up to 7 volts in a battery. In at least certain embodiments the multi-phase deposition layer provides improved charge/discharge capacity. In at least certain embodiments the multi-phase deposition layer provides improved wettability and favorable moisture retention properties. In at least certain embodiments the multi-phase deposition layer provides improved mechanical strength. By depositing a multi-phase metal or metal oxide matrix the membrane may have improved impedance/charge transfer, dielectric breakdown, and improved safety. By employing an ultra-thin deposition layer, the energy density of a battery may be increased. The multi-phase deposition is preferably an ultra-thin layer of metal or metal oxide applied to a porous membrane via a deposition technique that utilizes an external energy source such as laser, pulsed laser, or ultra-short pulsed laser deposition. Furthermore, the deposition layer in accordance with at least particular embodiments the battery separator membrane described herein the conductive deposition layer may be on at least the cathode facing side and in some embodiments may be embedded between and or within polyolefin membranes. In accordance with at least selected embodiments, the present application or invention is directed to novel or improved porous membranes or substrates, separator membranes, separators, composites, electrochemical devices, batteries, methods of making such membranes or substrates, separators, and/or batteries, and/or methods of using such membranes or substrates, separators and/or batteries.

With reference to FIGS. 10A to 13B of the drawings, and in accordance with one exemplary embodiment, FIG. 10A shows an exemplary PVD treated microporous polypropylene (PP) membrane (Celgard® 2500) with a conductive deposition or layer (Al), and FIG. 10B shows the exemplary PVD treated membrane with a ceramic coating (CS) over the PVD treatment (Al). In this example, the ceramic coating (CS) is an acrylic based binder and alumina particle ceramic coating (made using an aqueous slurry applied by gravure roll and dried in an oven, without plasma pretreat, and without surfactants) that is non-conductive and with properties shown in FIGS. 13A and 13B.

FIG. 11 is a schematic end view or cross-section view of the exemplary ceramic coated PVD treated membrane or film of FIG. 10B with vertical or thickness dimensions of membrane 25 um, Al deposition 20 nm, and ceramic coating with alumina particles of 4 um.

FIGS. 12A and 12B are respective cross-section SEM images at 2,700× magnification and 20,000× magnification of the ceramic coated PVD treated membrane or film of FIG. 10B showing the respective membrane, Al deposit, and ceramic coating layers.

It may be preferred to have such a ceramic coated PVD treated membrane or film with a powder fall of less than 0.03 and/or a coating peel force greater than 100.

Commonly owned U.S. published patent application 2017/0025658, published Jan. 26, 2017, is hereby fully incorporated by reference herein, and may describe, for example, certain porous membranes or substrates, separator membranes, separators, composites, electrochemical devices, batteries, methods of making such membranes or substrates, separators, and/or batteries, and/or methods of using such membranes or substrates, separators and/or batteries.

In at least selected embodiments of the present invention, novel or improved depositions, layers, membranes, porous membranes, microporous membranes, battery separators, batteries, high voltage batteries, systems, methods, and/or related methods of manufacture and/or use thereof are provided or described. In at least certain embodiments, improved membranes may contain at least one multi-phase metal or metal oxide deposition layer which is stable up to 5 volts in a battery. In at least certain particular embodiments, the multi-phase deposition layer provides improved charge/discharge capacity, improved wettability and/or favorable moisture retention properties, improved mechanical strength, a conductive layer, improved adhesion, improved coating adhesion, and/or the like. By depositing a multi-phase metal or metal oxide matrix on the membrane, the modified membrane may have improved impedance/charge transfer, dielectric breakdown, and/or improved safety. By employing an ultra-thin deposition layer, the energy density of a battery may be increased. The multi-phase deposition is preferably an ultra-thin layer of metal or metal oxide applied to a porous membrane via a deposition technique that utilizes an external energy source such as laser, pulsed laser, or ultra-short pulsed laser deposition. In accordance with at least particular embodiments, the improved battery separators or battery separator membranes described herein may have a conductive deposition layer on at least the cathode facing side and in some embodiments may be embedded between and or within polyolefin membranes. In accordance with at least selected embodiments, the present application or invention is directed to novel or improved porous membranes or substrates, separator membranes, separators, composites, electrochemical devices, batteries, cells, methods of making such membranes or substrates, separators, cells, and/or batteries, and/or methods of using such membranes or substrates, separators, cells, and/or batteries.

In accordance with at least selected embodiments, aspects or objects, the present application or invention is directed to novel or improved porous membranes or substrates, separator membranes, separators, composites, electrochemical devices, batteries, cells, systems, vehicles, products or devices including such membranes or substrates, separator membranes, separators, composites, electrochemical devices, batteries, cells, or systems, methods, methods of making such membranes or substrates, separators, cells, systems, and/or batteries, and/or methods of using such membranes or substrates, separators, cells, systems, and/or batteries.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

We claim:

1. A microporous membrane comprising a first layer that is conductive and comprised of aluminum, said first layer applied on a side of a polymeric porous membrane, and a ceramic layer comprising multi-crystalline phase alumina, said ceramic layer is applied with a physical vapor deposition method, wherein the ceramic layer is solely on top of the first layer and wherein the ceramic layer is non-conductive, and wherein the first layer has a thickness of twenty nanometers and the ceramic layer has a thickness of four microns.

2. The microporous membrane of claim 1 wherein said membrane is a component of an electrochemical device.

3. The microporous membrane of claim 1 wherein said membrane is a lithium battery separator.

4. The microporous membrane of claim 1 wherein said membrane is a lithium secondary battery separator that is stable against oxidation in a lithium ion battery with a cell voltage up to or equal to 5.2 volts or more, and the cell voltage is a measure of a potential difference between two electrodes in the lithium ion battery.

5. The microporous membrane of claim 1 wherein the polymeric porous membrane comprises polyolefin, polyvinylidene fluoride (PVdF), polyethylene terephthalate (PET), woven fibers, and/or nonwoven fibers.

6. The microporous membrane of claim 1 wherein the membrane or substrate is a monolayer or a multilayer membrane or substrate produced using a dry process, a wet process, a particle stretch process, a biaxially oriented polypropylene (BOPP) process, a beta nucleated biaxially oriented polypropylene (BN-BOPP) process, a nonwoven membrane process, or a combination thereof.

7. The microporous membrane of claim 3 wherein said first layer is on a side of the separator facing the cathode.

8. The microporous membrane of claim 3 wherein the microporous membrane or substrate is part of a lithium battery with an electrolyte comprising solvent and lithium salt.

9. A primary or secondary battery comprising a microporous membrane according to claim 1.

10. The microporous membrane of claim 1 wherein said membrane is a lithium secondary battery separator that is stable against oxidation in a lithium ion battery with a positive electrode potential of up to 5.4 volts or more versus a Li/Li+ reference electrode.

11. The microporous membrane of claim 6 wherein the membrane or substrate is a monolayer or a multilayer membrane or substrate produced using dry process.

12. The microporous membrane of claim 1, wherein the ceramic layer further comprises a binder.

13. A method of producing the ceramic layer of the microporous membrane of claim 12, comprising forming a slurry by combining the binder and the alumina, coating the microporous membrane or substrate or layers thereof with said slurry, and drying the coated microporous membrane or substrate.

14. The method of claim 13, wherein coating the microporous membrane or layers thereof with said slurry comprises a physical vapor deposition process.

* * * * *